US010535361B2

(12) United States Patent
Slapak

(10) Patent No.: US 10,535,361 B2
(45) Date of Patent: Jan. 14, 2020

(54) SPEECH ENHANCEMENT USING CLUSTERING OF CUES

(71) Applicant: Kardome Technology Ltd., Mazor (IL)

(72) Inventor: Alon Slapak, Mazor (IL)

(73) Assignee: Kardome Technology Ltd., Mazor (IL)

( * ) Notice: Subject to any disclaimer, the term of this patent is extended or adjusted under 35 U.S.C. 154(b) by 83 days.

(21) Appl. No.: 15/787,706

(22) Filed: Oct. 19, 2017

(65) Prior Publication Data

US 2019/0122686 A1 Apr. 25, 2019

(51) Int. Cl.

*G01L 21/02* (2006.01)
*G10L 21/0232* (2013.01)
*G10L 25/90* (2013.01)
*G10L 21/0224* (2013.01)
*G10L 21/0216* (2013.01)

(52) U.S. Cl.

CPC ...... *G10L 21/0232* (2013.01); *G10L 21/0224* (2013.01); *G10L 25/90* (2013.01); *G10L 2021/02166* (2013.01)

(58) Field of Classification Search

CPC . H03G 3/00; G10L 11/06; G10L 2021/02166; G10L 21/0277; G10L 25/90

See application file for complete search history.

(56) References Cited

U.S. PATENT DOCUMENTS 5,647,834 A * 5/1997 Ron ....................... A61B 15/16 600/23
5,774,837 A * 6/1998 Yeldener ................. G10L 19/12 704/206
6,593,956 B1 * 7/2003 Potts ..................... G01S 3/7865 348/14.09
7,076,433 B2 * 7/2006 Ito ........................... G10L 19/10 704/500
7,222,070 B1 * 5/2007 Stachurski .............. G10L 19/04 704/207
7,394,907 B2 * 7/2008 Tashev .................. G01S 3/8034 381/122

(Continued)

OTHER PUBLICATIONS

Benesty et al (IEEE Trans. Audio Speech and Language Processing, vol. 15, No. 3 Mar. 2007).*

(Continued)

*Primary Examiner* — Jialong He
(74) *Attorney, Agent, or Firm* — Shichrur & Co.

(57) ABSTRACT

A method for speech enhancement, the method may include receiving or generating sound samples that represent sound signals that were received during a given time period by an array of microphones; frequency transforming the sound samples to provide frequency-transformed samples; clustering the frequency-transformed samples to speakers to provide speaker related clusters, wherein the clustering is based on (i) spatial cues related to the received sound signals and (ii) acoustic cues related to the speakers; determining a relative transfer function for each speaker of the speakers to provide speakers related relative transfer functions; applying a multiple input multiple output (MIMO) beamforming operation on the speakers related relative transfer functions to provide beamformed signals; and inverse-frequency transforming the beamformed signals to provide speech signals.

19 Claims, 5 Drawing Sheets

(56) References Cited

U.S. PATENT DOCUMENTS

| | | | | |
|---|---|---|---|---|
| 8,239,052 | B2 * | 8/2012 | Itoyama | G10H 1/0008 700/94 |
| 9,554,203 | B1 * | 1/2017 | Pavlidi | H04R 1/08 |
| 9,560,446 | B1 * | 1/2017 | Chang | H04R 3/005 |
| 9,583,088 | B1 * | 2/2017 | May | G10H 3/186 |
| 2003/0103647 | A1 * | 6/2003 | Rui | G06K 9/00234 382/103 |
| 2004/0054527 | A1 * | 3/2004 | Quatieri, Jr. | G10L 25/90 704/207 |
| 2009/0012779 | A1 * | 1/2009 | Ikeda | G10L 21/0272 704/205 |
| 2010/0142327 | A1 * | 6/2010 | Kepesi | G01S 3/786 367/124 |
| 2010/0145205 | A1 * | 6/2010 | Haghighi-Mood | A61B 5/0452 600/509 |
| 2011/0015924 | A1 * | 1/2011 | Gunel Hacihabiboglu | G10L 21/0272 704/231 |
| 2011/0039547 | A1 * | 2/2011 | van Rensburg | H04W 72/1252 455/423 |
| 2011/0282658 | A1 * | 11/2011 | Wang | G10L 21/0272 704/208 |
| 2011/0307251 | A1 * | 12/2011 | Tashev | G10L 21/028 704/231 |
| 2013/0103382 | A1 * | 4/2013 | Kim | G06F 16/3344 704/2 |
| 2013/0185068 | A1 * | 7/2013 | Tanaka | G10L 15/08 704/233 |
| 2013/0304459 | A1 * | 11/2013 | Pontoppidan | H03G 3/00 704/207 |
| 2013/0317814 | A1 * | 11/2013 | Moriya | H03M 5/06 704/219 |
| 2014/0195227 | A1 * | 7/2014 | Rudzicz | G10H 1/366 704/231 |
| 2014/0226838 | A1 * | 8/2014 | Wingate | G10L 21/0272 381/111 |
| 2015/0296319 | A1 * | 10/2015 | Shenoy | H04S 7/302 381/303 |
| 2018/0005633 | A1 * | 1/2018 | Bocklet | G10L 17/04 |

OTHER PUBLICATIONS

Webpage ("The Unit Impulse Response" http://lpsa.swarthmore.edu/Transient/TransInputs/TransImpulse.html, Jan. 29, 2016).*

Chowning ("The Synthesis of Complex Audio Spectra by Means of Frequency Modulation", Journal of the Audio Engineering Society, 1972).*

Markovich et al. "Multichannel Eigenspace Beamforming in a Reverberant Noisy Environment With Multiple Interfering Speech Signals", IEEE Transactions on Audio, Speech, and Language Processing, vol. 17, No. 6, Aug. 2009. (Year: 2009).*

* cited by examiner

SPEECH ENHANCEMENT USING CLUSTERING OF CUES

BACKGROUND

The performance of the speech enhancement modules depends upon the ability to filter out all the interference signals leaving only the desired speech signals. Interference signals might be, for example, other speakers, noise from air conditions, music, motor noise (e.g. in a car or airplane) and large crowd noise also known as 'cocktail party noise'. The performance of speech enhancement modules is normally measured by their ability to improve the speech-to-noise-ratio (SNR) or the speech-to-interference-ratio (SIR), which reflects the ratio (often in dB scale) of the power of the desired speech signal to the total power of the noise and of other interfering signals respectively.

There is a growing need to perform speech enhancement in a reverberant environment.

SUMMARY

There may be provided method for speech enhancement, the method may include: receiving or generating sound samples that represent sound signals that were received during a given time period by an array of microphones; frequency transforming the sound samples to provide frequency-transformed samples; clustering the frequency-transformed samples to speakers to provide speaker related clusters, wherein the clustering may be based on (i) spatial cues related to the received sound signals and (ii) acoustic cues related to the speakers; determining a relative transfer function for each speaker of the speakers to provide speakers related relative transfer functions; applying a multiple input multiple output (MIMO) beamforming operation on the speakers related relative transfer functions to provide beamformed signals; and inverse-frequency transforming the beamformed signals to provide speech signals.

The method may include generating the acoustic cues related to the speakers.

The generating of the acoustic cues may include searching for a keyword in the sound samples; and extracting the acoustic cues from the keyword.

The method may include extracting spatial cues related to the keyword.

The method may include using the spatial cures related to the keyword as a clustering seed.

The acoustic cues may include pitch frequency, pitch intensity, one or more pitch frequency harmonics, and intensity of the one or more pitch frequency harmonics.

The method may include associating a reliability attribute to each pitch and determining that a speaker that may be associated with the pitch may be silent when a reliability of the pitch falls below a predefined threshold.

The clustering may include processing the frequency-transformed samples to provide the acoustic cues and the spatial cues; tracking over time states of speakers using the acoustic cues; segmenting the spatial cues of each frequency component of the frequency-transformed signals to groups; and assigning to each group of frequency-transformed signals an acoustic cue related to a currently active speaker.

The assigning may include calculating, for each group of frequency-transformed signals, a cross-correlation between elements of equal-frequency lines of a time frequency map with elements that belong to other lines of the time frequency map and may be related to the group of frequency-transformed signals.

The tracking may include applying an extended Kalman filter.

The tracking may include applying multiple hypothesis tracking.

The tracking may include applying a particle filter.

The segmenting may include assigning a single frequency component related to a single time frame to a single speaker.

The method may include monitoring at least one monitored acoustic feature out of speech speed, speech intensity and emotional utterances.

The method may include feeding the at least one monitored acoustic feature to an extended Kalman filter.

The frequency-transformed samples may be arranged in multiple vectors, one vector per each microphone of the array of microphones; wherein the method may include calculating an intermediate vector by weight averaging the multiple vectors; and searching for acoustic cue candidates by ignoring elements of the intermediate vector that have a value that may be lower than a predefined threshold.

The method may include determining the predefined threshold to be three times a standard deviation of a noise.

There may be provided a non-transitory computer readable medium that stores instructions that once executed by a computerized system cause the computerized system to: receive or generate sound samples that represent sound signals that were received during a given time period by an array of microphones; frequency transform the sound samples to provide frequency-transformed samples; cluster the frequency-transformed samples to speakers to provide speaker related clusters, wherein the clustering may be based on (i) spatial cues related to the received sound signals and (ii) acoustic cues related to the speakers; determine a relative transfer function for each speaker of the speakers to provide speakers related relative transfer functions; apply a multiple input multiple output (MIMO) beamforming operation on the speakers related relative transfer functions to provide beamformed signals; inverse-frequency transform the beamformed signals to provide speech signals.

The non-transitory computer readable medium may store instructions for generating the acoustic cues related to the speakers.

The generating of the acoustic cues may include searching for a keyword in the sound samples; and extracting the acoustic cues from the keyword.

The generating of the acoustic cues may include searching for a keyword in the sound samples; and extracting the acoustic cues from the keyword.

The non-transitory computer readable medium may store instructions for extracting spatial cues related to the keyword.

The non-transitory computer readable medium may store instructions for using the spatial cures related to the keyword as a clustering seed.

The acoustic cues may include pitch frequency, pitch intensity, one or more pitch frequency harmonics, and intensity of the one or more pitch frequency harmonics.

The non-transitory computer readable medium may store instructions for associating a reliability attribute to each pitch and determining that a speaker that may be associated with the pitch may be silent when a reliability of the pitch falls below a predefined threshold.

The clustering may include processing the frequency-transformed samples to provide the acoustic cues and the spatial cues; tracking over time states of speakers using the acoustic cues; segmenting the spatial cues of each frequency component of the frequency-transformed signals to groups;

and assigning to each group of frequency-transformed signals an acoustic cue related to a currently active speaker.

The assigning may include calculating, for each group of frequency-transformed signals, a cross-correlation between elements of equal-frequency lines of a time frequency map with elements that belong to other lines of the time frequency map and and may be related to the group of frequency-transformed signals.

The tracking may include applying an extended Kalman filter.

The tracking may include applying multiple hypothesis tracking.

The tracking may include applying a particle filter.

The segmenting may include assigning a single frequency component related to a single time frame to a single speaker.

The non-transitory computer readable medium may store instructions for monitoring at least one monitored acoustic feature out of speech speed, speech intensity and emotional utterances.

The non-transitory computer readable medium may store instructions for feeding the at least one monitored acoustic feature to an extended Kalman filter.

The frequency-transformed samples may be arranged in multiple vectors, one vector per each microphone of the array of microphones; wherein the non-transitory computer readable medium may store instructions for calculating an intermediate vector by weight averaging the multiple vectors; and searching for acoustic cue candidates by ignoring elements of the intermediate vector that have a value that may be lower than a predefined threshold.

The non-transitory computer readable medium may store instructions for determining the predefined threshold to be three times a standard deviation of a noise.

There may be provided a computerized system that may include an array of microphones, a memory unit and a processor. The processor may be configured to receive or generate sound samples that represent sound signals that were received during a given time period by an array of microphones; frequency transform the sound samples to provide frequency-transformed samples; cluster the frequency-transformed samples to speakers to provide speaker related clusters, wherein the clustering may be based on (i) spatial cues related to the received sound signals and (ii) acoustic cues related to the speakers; determine a relative transfer function for each speaker of the speakers to provide speakers related relative transfer functions; apply a multiple input multiple output (MIMO) beamforming operation on the speakers related relative transfer functions to provide beamformed signals; inverse-frequency transform the beamformed signals to provide speech signals; and wherein the memory unit may be configured to store at least one of the sound samples and the speech signals.

The computerized system may not include the array of microphones but may receive signals from the array of microphones that represent the sound signals that were received during the given time period by the array of microphones.

The processor may be configured to generate the acoustic cues related to the speakers.

The generating of the acoustic cues may include searching for a keyword in the sound samples; and extracting the acoustic cues from the keyword.

The processor may be configured to extract spatial cues related to the keyword.

The processor may be configured to use the spatial cures related to the keyword as a clustering seed.

The acoustic cues may include pitch frequency, pitch intensity, one or more pitch frequency harmonics, and intensity of the one or more pitch frequency harmonics.

The processor may be configured to associate a reliability attribute to each pitch and determining that a speaker that may be associated with the pitch may be silent when a reliability of the pitch falls below a predefined threshold.

The processor may be configured to cluster by processing the frequency-transformed samples to provide the acoustic cues and the spatial cues; track over time states of speakers using the acoustic cues; segmenting the spatial cues of each frequency component of the frequency-transformed signals to groups; and assign to each group of frequency-transformed signals an acoustic cue related to a currently active speaker.

The processor may be configured to assign by calculating, for each group of frequency-transformed signals, a cross-correlation between elements of equal-frequency lines of a time frequency map with elements that belong to other lines of the time frequency map and and may be related to the group of frequency-transformed signals.

The processor may be configured to track by applying an extended Kalman filter.

The processor may be configured to track by applying multiple hypothesis tracking.

The processor may be configured to track by applying a particle filter.

The processor may be configured to segment by assigning a single frequency component related to a single time frame to a single speaker.

The processor may be configured to monitor at least one monitored acoustic feature out of speech speed, speech intensity and emotional utterances.

The processor may be configured to feed the at least one monitored acoustic feature to an extended Kalman filter.

The frequency-transformed samples may be arranged in multiple vectors, one vector per each microphone of the array of microphones; wherein the processor may be configured to calculate an intermediate vector by weight averaging the multiple vectors; and search for acoustic cue candidates by ignoring elements of the intermediate vector that have a value that may be lower than a predefined threshold.

The processor may be configured to determine the predefined threshold to be three times a standard deviation of a noise.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Figure 1:
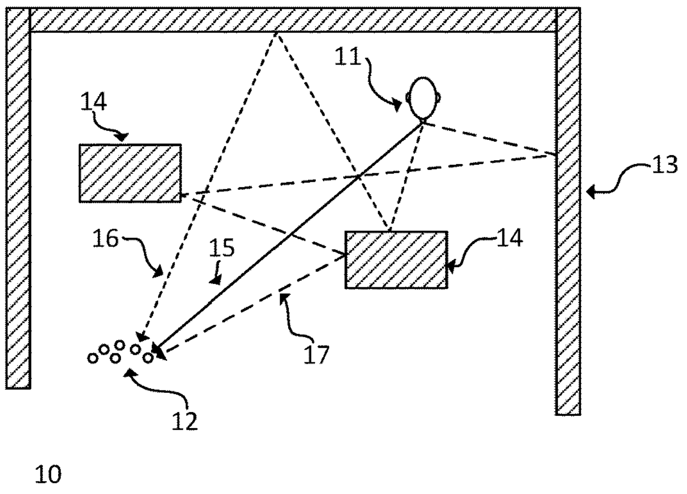
FIG. 1 illustrates multipath.

Any reference to a system should be applied, mutatis mutandis to a method that is executed by a system and/or to a non-transitory computer readable medium that stores instructions that once executed by the system will cause the system to execute the method.

Any reference to method should be applied, mutatis mutandis to a system that is configured to execute the method and/or to a non-transitory computer readable medium that stores instructions that once executed by the system will cause the system to execute the method.

Any reference to a non-transitory computer readable medium should be applied, mutatis mutandis to a method that is executed by a system and/or a system that is configured to execute the instructions stored in the non-transitory computer readable medium.

The term "and/or" is additionally or alternatively.

The term "system" means a computerized system.

Speech enhancement methods are focused on extracting a speech signal from a desired source (speaker) when the signal is interfered by noise and other speakers. In a free-filed environment, spatial filtering in the form of directional beamforming is effective. However, in a reverberant environment, the speech from each source is smeared across several directions, not necessarily successive, deteriorating the advantages of the ordinary beamformers. Using transfer-function (TF) based beamformers to address this issue, or using the relative transfer function (RTF) as the TF itself are a promising direction. However, in multi-speaker environments, the ability to estimate the RTF for each speaker, when the speech signals are captured simultaneously, is yet a challenge. There is provided a solution that involves tracking acoustic and spatial cues to cluster simultaneous speakers, thereby facilitating estimation of the RTF of the speakers in a reverberant environment.

There is provided a clustering algorithm of speakers which assigns each frequency component to its original speaker especially in multi-speaker reverberant environments. This provides the necessary condition for the RTF estimator to work properly in multi-speaker reverberant environments. The estimate of the RTFs matrix is then used to compute the weight vector of the transfer function based linear constrained minimum variance (TF-LCMV) beamformer (see Equation (10) in the sequel) and thus satisfies the necessary condition for TF-LCMV to work. It is assumed that each human speaker is endowed with a different pitch, so that the pitch is a bijective indicator to a speaker. Multi-pitch detection is known to be a challenging task especially in a noisy, reverberant multi-speaker environment. To address this challenge, the W-Disjoint Orthogonality (W-DO) assumption is employed, and a set of spatial cues, for example, signal intensity, azimuth angle and elevation angle, are used as additional features. The acoustical cues—pitch values—are tracked over time using extended Kalman filter (EKF) to overcome temporary inactive speakers and changes in pitch, and the spatial cues are used to segment the last L frequency components and to assign each frequency component to different sources. The result of the EKF and the segmentation is combined by means of cross-correlation to facilitate the clustering of the frequency components to a specific speaker with a specific pitch.

FIG. 1 describes the paths along which the frequency components of the speech signal travel from a human speaker 11 to the microhome array 12 in a reverberant environment. The walls 13 and other elements in the environment 14 reflect the impinging signal with attenuation and reflecting angle which depend on the material and the texture of the wall. Different frequency components of the human speech might take different paths. These might be a direct path 15 which reside on the shortest path between the human speaker 11 and the microphone array 12, or indirect paths 16, 17. Note that a frequency component might travel along one or more paths.

Figure 2:
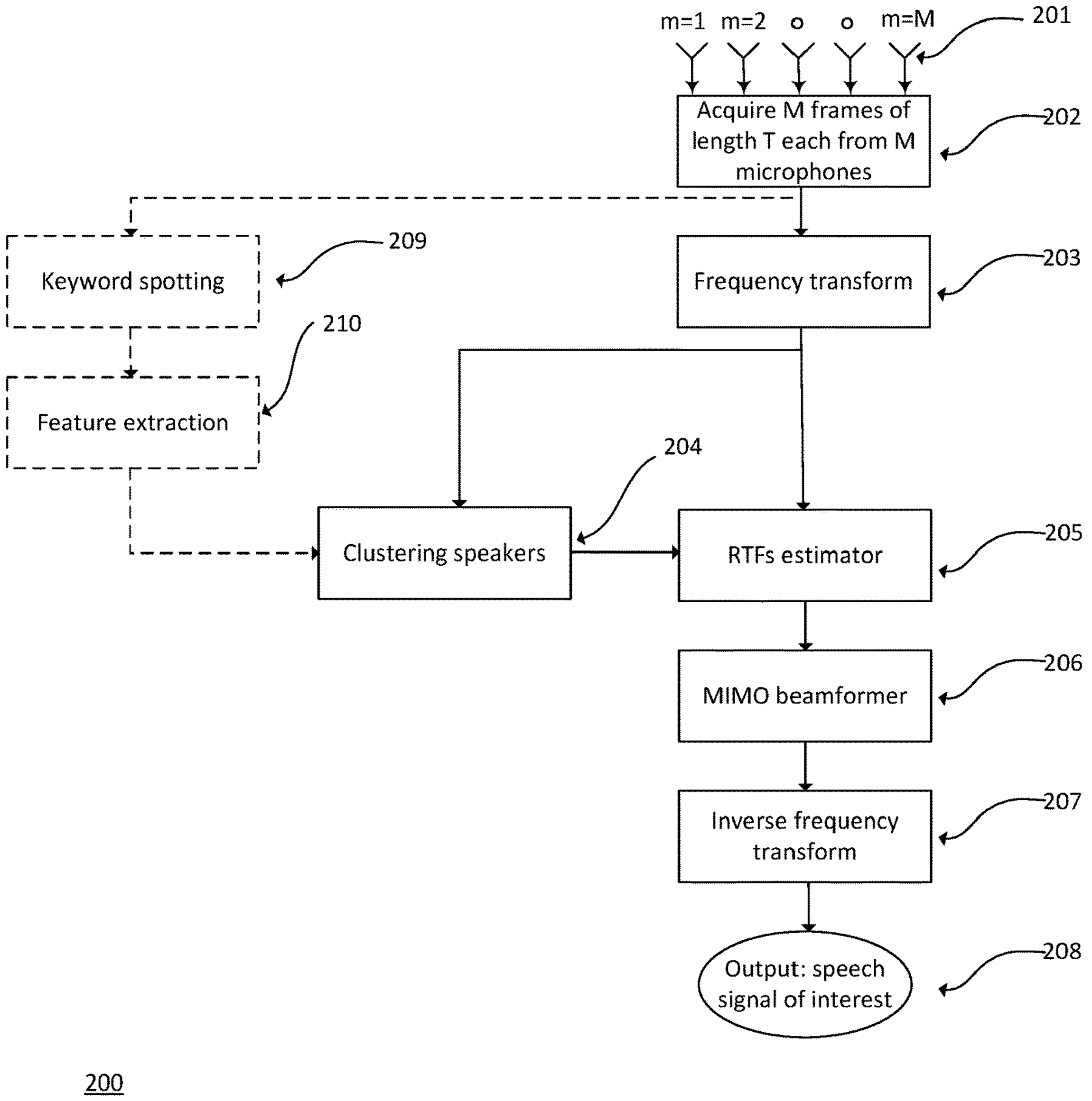
FIG. 2 illustrates an example of a method.

FIG. 2 describes the algorithm. The signals are acquired by the microphone array 201 which contains $M \geq 2$ microphones, where $M=7$ microphones is one example. The microphones can be deployed in a range of constellations such as equally-spaced on a straight line, on a circle or on a sphere, or even unevenly spaced forming arbitrary shape. The signal from each microphone is sampled, digitized, and stored in M frames, each contains T consecutive samples 202. The size of the frames T may be selected to be large enough such that the short-time Fourier transform (STFT) is accurate, but short enough so that the signal is stationary along the equivalent time duration. A typical value for T is 4,096 samples for sampling rate of 16 kHz, that is, the frame is equivalent to ¼ second. Often, consecutive frames overlap each other for improved tracking after the features of the signal over time. A typical overlap is 75%, that is, a new frame is initiated every 1,024 samples. T may, for example, range between 0.1 Sec-2 Sec—thereby providing 1024-32768 sampled for 16 kHz sampling rate. The samples are also referred to as sound samples that represent sound signals that were received by the array of microphones during period of time T.

Each frame is transformed in 203 to the frequency domain by applying Fourier transform or a variant of Fourier transform such as short time Fourier transform (STFT), constant-Q transform (CQT), logarithmic Fourier transform (LFT), filter bank and alike. Several techniques such as windowing and zero-padding might be applied to control the framing effect. The results of 203 is M complex-valued vectors of length K. If, for example, the array includes 7 microphones, 7 vectors are prepared which are registered by the frame time-index l. K is the number of frequency bins, and is determined by the frequency transform. For example, when using ordinary STFT, K=T which is the length of the buffer. The output of step 203 may be referred to as frequency-transformed signals.

The speech signals are clustered to different speakers in 204. The clusters may be referred to as speaker related clusters. Unlike prior art works which cluster speakers based on direction only, 204 deals with multi-speakers in a reverberant room, so that signals from different directions can be assigned to the same speaker due to the direct paths and the indirect paths. The proposed solution suggests using a set of acoustic cues, for example, the pitch frequency and intensity, and its harmonics frequencies and intensities, on top of a set of spatial cues, for example the direction (azimuth and elevation) and the intensity of the signal in one of the microphones. The pitch and one or more of the spatial cues are served as the state vector for a tracking algorithm such as Kalman filter and its variants, multiple hypothesis tracking (MHT) or particle filter, which are used to track this state vector, and to assign each track to a different speaker.

All these tracking algorithms use a model which describes the dynamics of the state vector in time, so that, when measurements of the state vector are missing or corrupted by noise, the tracking algorithm compensate for this using the dynamic model, and simultaneously updates the model parameters. The output of this stage is a vector, assigning each frequency component at a given time to each speaker. 204 is further elaborated in FIG. 3.

An RTF estimator is applied in 205 to the data in the frequency domain. The result of this stage is a set of RTFs each is registered to the associate speaker. The registration process, is done using the clustering array from the clustering speakers 204. The set of RTFs are also referred to as speakers related relative transfer functions.

The MIMO beamformer 206 reduces the energy of the noise and of the interfering signals with respect to the energy of the required speech signal by means of spatial filtering. The output of step 206 may be referred to as beamformed signals. The beamformed signals are then forwarded to the inverse frequency transform 207 to create a continuous speech signal in the form of a stream of samples, which is transferred, in turn, to other elements such as speech recognition, communication systems and recording devices 208.

In a preferred embodiment of the invention, a keyword spotting 209 can be used to improve the performance of the clustering block 204. The frames from 202 are searched for a pre-defined keyword (for example "hello Alexa", or "ok Google"). Once the keyword is spotted in the stream of frames, the acoustic cues of the speaker are extracted, such as the pitch frequency and intensity and its harmonics frequencies and intensities. Also, the features of the paths over which each frequency component has arrived at the microphone array 201, are extracted. These features are used by the clustering speaker 204 as a seed for the cluster of the desired speaker. Seed is an initial guess as to the initial parameters of the cluster. For example, the cluster's centroid, radius and statistics for centroid-based clustering algorithms such as K-means, PSO and 2 KPM. Another example is the bases of the subspace for subspace-based clustering.

Figure 3:
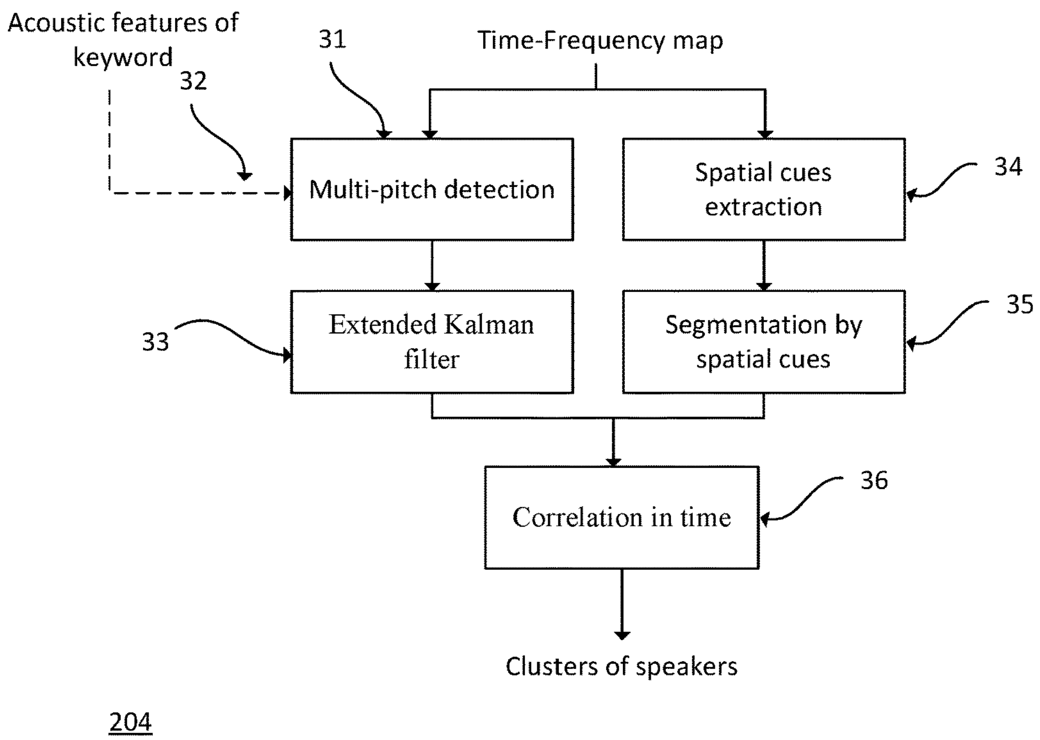
FIG. 3 illustrates an example of a clustering step of the method of FIG. 2.

FIG. 3 describes the clustering algorithm of speakers. It is assumed that each speaker is endowed with a different set of acoustic cues, for example, pitch frequency and intensity and its harmonics frequencies and intensities, so that the set of acoustic cues is a bijective indicator to a speaker. Acoustic cues detection is known to be a challenging task especially in a noisy, reverberant multi-speaker environment. To address this challenge, the spatial cues, for example, in the form of the signal intensity, the azimuth angle and the elevation angle are used. The acoustical cues are tracked over time using filters such as particle filter and extended Kalman filter (EKF) to overcome temporary inactive speakers and changes in acoustic cues, and the spatial cues are used to segment the frequency components among different sources. The result of the EKF and the segmentation is combined by means of cross-correlation to facilitate the clustering of the frequency components to a specific speaker with a specific pitch.

In 31 potential acoustic cues in the form of pitch frequencies are detected as an example of one preferred embodiment. First, a time-frequency map is prepared using the frequency transform of the buffers from each microphone, which are computed in 203. Next, the absolute value of each of the M K-long complex-valued vectors are weight-averaged, with some weight factors which can be determined so as to diminish artifacts in some of the microphones. The result is a single K-long real vector. In this vector, values higher than a given threshold μ are extracted, while the rest of the elements are discarded. The threshold μ is often selected adaptively as being three times the standard deviation of the noise, but no less than a constant value which depends on the electrical parameters of the system, and especially on the number of effective bits of the sampled signal. Values with frequency index within the range of [k_min, k_max] are defined as candidates for pitch frequencies. Variable k_min and k_max are typically 85 Hz and 2550 Hz respectively, as typical adult male will have a fundamental frequency from 85 to 1800 Hz, and that of a typical adult female from 165 to 2550 Hz. Each pitch candidate is then verified by searching for its higher harmonics. The existence of the $2^{nd}$ and $3^{rd}$ harmonics may be a prerequisite for a candidate pitch to be detected as a legitimate pitch with reliability R (say, R=10). If higher harmonics (e.g., $4^{th}$ and $5^{th}$) exist, the reliability of the pitch may be increased—for example doubled for each harmonic. An example can be found in FIG. 4. In a preferred embodiment of the invention, the pitch of the desired speaker 32 is supplied by 210 using a keyword that was uttered by the desired speaker. The supplied pitch 32 is added to the list with the highest possible reliability, say R=1000.

In 33, an extended Kalman filter (EKF) is applied to the pitch from 31. As noted by the Wikipedia entry on extended Kalman filters (www.wikipedia.org/wiki/Extended_Kalman_filter), a Kalman filter has a state transition equation and an observation model. The state transition equation, for a discrete calculation, is:

$$x_k=f(x_{k-1},u_k)w_k \tag{1}$$

And the observation model, for a discrete calculation, is:

$$z_k=h(x_k)+v_k \tag{2}$$

where $x_k$ is the state vector which contains parameters which (partially) describe the status of a system, $u_k$ is a vector of external inputs which provide information on the status the system, $w_k$ and $v_k$ are the process and observation noises. Time updater of the extended Kalman filter may predict the next state with prediction equations and detected pitch may update the variables by comparing the actual measurement with the predicted measurement, using the following type of equation:

$$y_k=z_k-h(x_{k|k+1}) \tag{3}$$

where $z_k$ is the detected pitch and $y_k$ is the error between the measurement and the predicted pitch.

In 33, each trajectory may begin from a detected pitch, followed by a model f ($x_k$, $u_k$), reflecting the temporal behavior of the pitch, which might go higher or lower because of emotions. The model's inputs may be past state vectors $x_k$ (either one state vector or more), and any external inputs $u_k$ which affect the dynamics of the pitch, such as the speed of the speech, intensity of speech and emotional utterances. The elements of the state vector x may quantitatively describe the pitch. For example, a state vector of a pitch might include, inter alia, the pitch frequency, the intensity of the $1^{st}$ order harmonics, and the frequency and intensity of higher harmonics. The vector function f ($x_k$, $u_k$) may be used to predict the state-vector x at some given time k+1 ahead of the current time. An exemplary realization of the dynamic model in the EKF may include the time update equation (a.k.a. prediction equation) as is described in the book "Lessons in Digital Estimation Theory" by Jerry M. Mendel, which is incorporated herein by reference.

Considering, for example, the 3-tuple state-vector:

$$b_k=[f_k a_k b_k]^T\in\mathbb{R}^3 \tag{4}$$

where $f_k$ is the frequency of the pitch ($1^{st}$ harmonic) at time k, $a_k$ is the intensity of the pitch ($1^{st}$ harmonic) at time k, and $b_k$ is the intensity of the $2^{nd}$ harmonic at time k.

An exemplary state-vector model for the pitch may be:

$$x_k=x_{k-1}\in\mathbb{R}^4 \tag{5}$$

Which describes a model which assumes a constant pitch at all time. In a preferred embodiment of the invention, the speed of the speech, intensity of speech and emotional utterances using speech recognition algorithms as are known in the art, are monitored continuously, providing external inputs $u_k$ which improves the time update stage of the EKF. Emotional utterance methods are known in the art. See, for example "New Features for Emotional Speech Recognition" by Palo et. al.

Each track is endowed with reliability field which is inversely proportional to the time over which the track evolves using the time update only. When the reliability of a track goes below some reliability threshold ρ, say, representing 10 seconds of undetected pitch, the track is defined as dead, which means that the respective speaker is not active. On the other hand, when a new measurement (pitch detection) appears, which cannot be assigned to any of the existing tracks, a new track is initiated.

In 34, the spatial cues are extracted from the M frequency-transformed frames. As in 31, the recent L vectors are saved for analysis using correlation in time. The result is a time-frequency-Cue (TFC) map, which is a 3-dimensional array of size LxKxP (where P=M−1) for each of the M microphones. The TFC is described in FIG. 5.

In 35, the spatial cues of each frequency component in the TFC are segmented. The idea is that along the L frames, a frequency component might originate from different speakers, and this can be observed by comparing the spatial cues. It is assumed, however, that at a single frame time 1, the frequency component originates from a single speaker, owing to the W-DO assumption. The segmentation can be performed using any known method in the literature which is used for clustering such as K nearest neighbors (KNN). The clustering assigns an index c (k,l)∈ℕ to each cell in A, which indicates to which cluster the cell (k,l) belongs.

In 36, the frequency components of the signals are grouped such that each frequency component is assigned to a specific pitch in the list of pitches which are tracked by the EKF and is active by its reliability. This is done by computing the sample-cross-correlation between the $k^{th}$ line of the time-frequency map (see FIG. 4), which is assigned to one of the pitches, with all the values with a specific cluster index $c_0$ (j,l) in other lines in the time-frequency map. This is done for every cluster index. The sample cross-correlation is given by:

$$R(k, j, c_0) = \frac{1}{L} \sum_{\substack{l=0 \\ c(j,l)=c_0}}^{L-1} A(k, l) \cdot A(j, l) \tag{6}$$

Where A is the time-frequency map, k is the index of the line belonging to one of the pitches, j is any other line of A and L is the number of columns of A. After computing the sample cross-correlation between each pitch and each of the clusters in other lines, the cluster $c_1$ in line $j_1$ with the highest cross-correlation is grouped with the respective pitch, and then the cluster $c_2$ in line $j_2$ with the second highest cross-correlation is grouped with the respective pitch, and so forth. This process is repeated until the sample-cross correlation goes below some threshold κ which can be set adaptively as, say, 0.5×(the average energy of the signal at a single frequency). The result of 35 is a set of groups of frequencies endowed with the respective pitch frequency.

Figure 4:
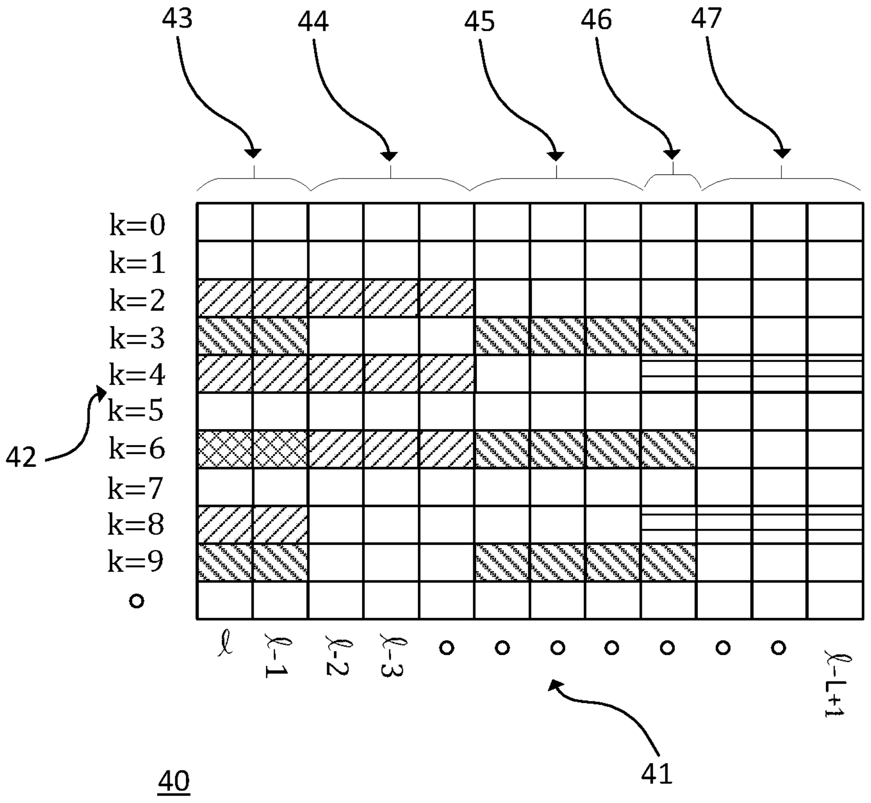
FIG. 4 illustrates an example of a pitch detection over a time-frequency map.

FIG. 4 describes an example of the pitch detection over the time-frequency map. 41 is the time axis, which is denoted by the parameter $\ell$, and 42 is the frequency axis which is described by the parameter k. Each column in this 2-dimensional array is the K-long real valued vector extracted in 31 after averaging the absolute value of the M frequency transformed buffers at time $\ell$. For the correlation analysis in time, the L recent vectors are saved in a 2 dimensional array of size K×L. In 43 two pitches are denoted by diagonal lines at different directions. The pitch k=2 with its harmonics at k=4,6,8, has reliability R=20 because of the existence of the 4th harmonics, and the pitch at k=3 with its harmonics at k=6,9 has reliability R=10. In 44 the k=3 pitch is inactive, and only k=2 is active. However, the reliability of the k=2 pitch is decreased to R=10 as the 4th harmonics is not detected (below the threshold ρ). In 45 the pitch of k=3 is active again and the k=2 is inactive. In 46 a new pitch candidate at k=4 is emerged, but only its $2^{nd}$ harmonic is detected. Therefore, it is not detected is a pitch. In 47 the k=3 pitch is inactive no pitch is detected.

Figure 5:
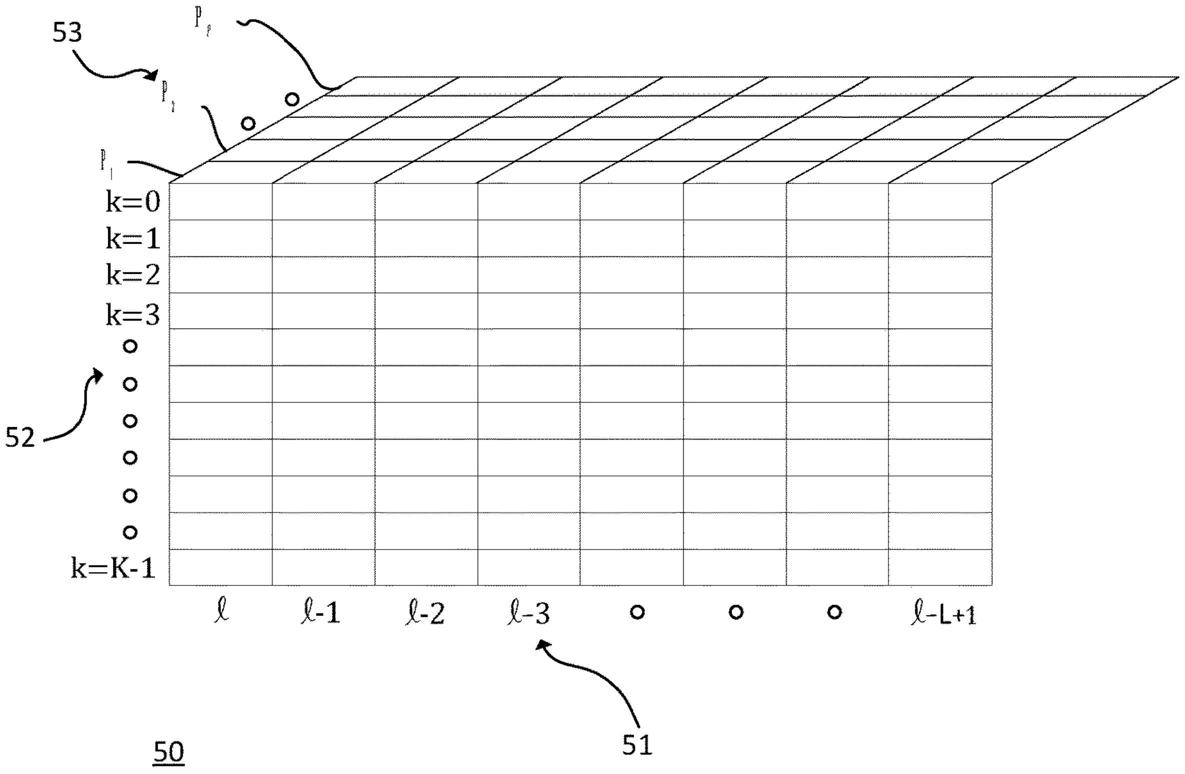
FIG. 5 illustrates an example of a a time-frequency-Cue map.

FIG. 5 describes the TFC-map, whose axes are the frame index (time) 51, the frequency component 52 and the spatial cues 53, which might be, for example, a complex value expressing the direction (azimuth and elevation) from which each frequency component arrives, and the intensity of the component. When the frames with index $\ell$ are processed and transferred to the frequency domain, a vector of M complex number is received for each frequency element $\{k\}_{k=0}^{K-1}$. From each vector, up to M−1 spatial cues are extracted. In the example of direction and intensity of each frequency component, this might be done using any direction-finding algorithm for array processing which is known in the art such as MUSIC or ESPRIT. The result of this algorithm is a set of up to M−1 directions in 3-dimensional space, each is expressed by two angles and the estimated intensity of the arriving signal $p_p(\ell,k) \triangleq (a(\ell,k),\theta(\ell,k),\phi(\ell,k))$, p=1, . . . , P≤M−1. The cues are arranged in the TFC-map such that $p_{p_0}(\ell_0,k_0)$ at the cell indexed by $\ell_0,k_0,p_0$.

Appendix

The performance of the speech enhancement modules depends upon the ability to filter out all the interference signals leaving only the desired speech signals. Interference signals might be, for example, other speakers, noise from air conditions, music, motor noise (e.g. in a car or airplane) and large crowd noise also known as 'cocktail party noise'. The performance of speech enhancement modules is normally measured by their ability to improve the speech-to-noise-ratio (SNR) or the speech-to-interference-ratio (SIR), which reflects the ratio (often in dB scale) of the power of the desired speech signal to the total power of the noise and of other interfering signals respectively.

When the acquisition module contains a single microphone, the methods are termed single-microphone speech enhancement and are often based on the statistical features of the signal itself in the time-frequency domain such as single channel spectral subtraction, spectral estimation using minimum variance distortionless response (MVDR) and echo-cancelation. When more than a single microphone is used, the acquisition module is often termed microphone array, and the methods—multi-microphone speech enhancement. Many of these methods exploit the differences between the signals captured simultaneously by the microphones. A well-established method is the beamforming which sums-up the signals from the microphones after multiplying each signal by a weighting factor. The objective of the weighting factors is to average out the interference signals so as to condition the signal of interest.

Beamforming, in other words, is a way of creating a spatial filter which algorithmically increases the power of a signal emitted from a given location in space (the desired signal from the desired speaker), and decreases the power of signals emitted from other locations in space (interfering signals from other sources), thereby increasing the SIR at the beamformer output.

Delay-and-sum beamformer (DSB) involve using weighting factors of a DSB are composed of the counter delays implied by the different ways along which the desired signal travels from its source to each of the microphones in the array. DSB is limited to signals which come from a single direction each, such as in free-field environments. Consequently, in reverberant environments, in which signals from the same sources travel along different ways to the microphones and arrive at the microphone from a plurality of directions, DSB performance is typically insufficient.

To mitigate the drawbacks of DSB in reverberant environments, beamformers may use more complicated acoustic transfer function (ATF), which represents the direction (azimuth and elevation) from which each frequency component arrives at a specific microphone from a given source. A single direction of arrival (DOA), which is assumed by DSB and other DOA based methods, often doesn't hold true in reverberant environments, where the components of the same speech signal arrive from different directions. This is because of the different frequency response of physical elements in a reverberant environment such as walls, furniture, and peoples. The ATF in the frequency domain is a vector assigning a complex number to each frequency in the Nyquist bandwidth. The absolute value represents the gain of the path related to this frequency, and the phase indicates the phase which is added to the frequency component along the path.

Estimating the ATF between a given point in space and a given microphone may be done by means of using a loudspeaker positioned at the given point and emitting a known signal. Taking simultaneously the signals from the input of the speaker and the output of the microphone one can readily estimate the ATF. The loudspeaker may be situated at one or more positions where human speakers might reside during the operation of the system. This method creates a map of ATFs for each point in space, or more practically, for each point on a grid. ATFs of points not included in the grid are approximated using interpolation. Nevertheless—this method suffers from major drawbacks. First, the need to calibrate the system for each installation making this method impractical. Second, the acoustic difference between human speaker and an electronic speaker, which deviates the measured ATF from the actual one. Third, the complexity of measuring a huge number of ATFs, especially when considering also the direction of the speaker, and forth, possible errors due to changes of the environment.

A more practical alternative to the ATF is the relative transfer function (RTF) as a remedy for the disadvantages of ATF estimation methods in practical applications. The RTF is the difference between the ATFs between a given source to two of the microphones in the array, which, in the frequency domain takes the form of the ratio between the spectral representation of the two ATFs. Like the ATF, the RTF in the frequency domain assigns a complex number to each frequency. The absolute value is the gain difference between the two microphones, which is often close to unity when the microphones are close to each other, and the phase, under some conditions, reflects the incident angle of the source.

Transfer function based linear constrained minimum variance (TF-LCMV) beamformer may reduce noise while limiting speech distortion, in multi-microphone applications, by minimizing the output energy subject to the constraint that the speech component in the output signal is equal to the speech component in one of the microphone signals. Given $N=N_d+N_i$ sources, consider the problem of extracting $N_d$ desired speech sources, contaminated by $N_i$ interfering sources, and a stationary noise. Each of the involved signals propagates through the acoustic medium before being picked by an arbitrary array comprising M microphones. The signal of each microphone is segmented to frames of length T and FFT is applied to each frame. In the frequency domain, let us denote the k-th frequency component of the $\ell$-th frame of the m-th microphone and the n-th source by $z_m(\ell,k)\in\mathbb{C}$, and $s_n(\ell,k)\in\mathbb{C}$, respectively. Similarly, the ATF between the n-th source and the m-th microphone is $g_{m,n}(\ell,k)$, and the noise at the m-th microphone is $v_m(\ell,k)$. The received signal in a matrix form is given by:

$$z(\ell,k)=G(\ell,k)s(\ell,k)+v(\ell,k)\in\mathbb{C}^M \tag{7}$$

Where $z(\ell,k)=[z_1(\ell,k), \ldots, z_M(\ell,k)]^T\in\mathbb{C}^M$ is the sensor vector, $s(\ell,k)=[s_1(\ell,k), \ldots, s_N(\ell,k)]^T\in\mathbb{C}^N$ is the sources vector, $G(\ell,k)\in\mathbb{C}^{M\times N}$ is the ATFs matrix such that $[G(\ell,l)]_{m,n}=g_{m,n}(\ell,k)\in\mathbb{C}$, and $v(\ell,k)=[v_1(\ell,k), \ldots, v_M(\ell,k)]^T\in\mathbb{C}^N$ is an additive stationary noise, uncorrelated with any of the sources. Equivalently, (7) can be formulated using the RTFs. Without loss of generality, the RTF of the n-th speech source $h_{m,n}(\ell,k)\in\mathbb{C}$ can be defined as the ratio between the n-th speech components at the m-th microphone, and its respective component at the first microphone, i.e., $h_{m,n}(\ell,k)=g_{m,n}(\ell,k)/g_{1,n}(\ell,k)$. The signal in (7) can be formulated using the RTFs matrix $H(\ell,k)\in\mathbb{C}^{M\times N}$, such that $[H(\ell,k)]_{m,n}=h_{m,n}(\ell,k)\in\mathbb{C}$, in a vector notation:

$$z(\ell,k)=H(\ell,k)x(\ell,k)+v(\ell,k)\in\mathbb{C}^M \tag{8}$$

Where $x_n(\ell,k)=g_{1,n}(\ell,k)s_n(\ell,k)\in\mathbb{C}$ is the altered source signal.

There is a need to estimate the mixture of the $N_d$ desired sources, given the array measurements $z(\ell,k)$. The extraction of the desired signals can be accomplished by applying a beamformer $w(\ell,k)\in\mathbb{C}^M$ to the microphone signals $y(\ell,k)=w^H(\ell,k)z(\ell,k)\in\mathbb{C}$. Assuming $M\geq N$, $w(\ell,k)\in\mathbb{C}^m$ can be chosen to satisfy the LCMV criterion:

$$\begin{aligned} w(\ell, k) &= \arg\min_w \{w^H(\ell, k)\Phi_{vv}(\ell, k)w(\ell, k)\} \\ \text{s.t. } & H^H(\ell, k)w(\ell, k) = c(\ell, k) \end{aligned} \tag{9}$$

where $\Phi_{vv}(\ell,k)\in\mathbb{C}^{M\times M}$ is the power spectral density (PSD) matrix of $v(\ell,k)$ and $c(\ell,k)\in\mathbb{C}^{N\times 1}$ is the constraint vector.

A possible solution to (9) is:

$$w_{LCMV}(\ell,k)=\Phi_{vv}^{-1}H(\ell,k)(H^H(\ell,k)\Phi_{vv}^{-1}(\ell,k))^{-1}c(\ell,k) \tag{10}$$

Based on (7) an (8) and the constrains set, the components of the desired signals at the beamformer output is given by $d(\ell,k)=c^H(\ell,k)x(\ell,k)\in\mathbb{C}$, that is, the output of the beamformer is a mixture of the components of the desired signals as measured by the first (reference) microphone.

From the $\ell$-th set of RTFs and for each frequency component k, a set of up to M−1 source, with incident angles $\theta_p(\ell,k)$, p=1, . . . , P≤M−1, and the elevation angles $\phi_p(\ell,k)$ can be extracted using, for example, phase-difference based algorithms, together with the intensity $a_p(\ell,k)$ taken from one of the microphones which is defined as the reference one. These 3-tuples $p_p(\ell,k)\triangleq(a(\ell,k),\theta(\ell,k),\phi(\ell,k))_p\in\mathbb{R}^3$ are often called spatial cues.

The TF-LCMV is an applicable method for extracting M−1 speech source impinging an array comprising of M sensors from different locations in a reverberant environment. However, a necessary condition for the TF-LCMV to work is that the RTFs matrix $H(\ell,k)$ whose columns are the RTF vectors of all the active sources in the environment is known and available to the TF-LCMV. This needs association of each frequency component to its source speaker.

Several methods may be used to assign sources to signals without supplementary information. Major family of methods is termed blind source separation (BSS) which recovers unknown signals or sources from their observed mixtures. The key weakness of BSS in the frequency domain is that at each frequency, the column vectors of the mixing matrix (estimated by BSS) are permuted randomly, and without knowledge of this random permutation, combining results across frequencies becomes difficult as disclosed.

BSS may be assisted by the pitch information. However, the gender of the speakers is required a-priory. BSS may be used in the frequency domain, while resolving the ambiguity of the estimated mixing matrix using the maximum-magnitude method, which assigns a specific column of the mixing matrix to the source corresponds to the maximal element in the vector. Nevertheless—this method depends heavily on the spectral distributions of the sources as it is assumed that the strongest component at each frequency indeed belongs to the strongest source. However, this condition is not often met, as different speakers might introduce intensity peaks at different frequencies. Alternatively, source activity detection may be used, also known as voice activity detection (VAD), such that the information on the active source at a specific time is used to resolve the ambiguity in the mixing matrix. The drawback of VAD is that the voice-pause cannot be robustly detected, especially in a multi-speaker environment. Also, this method is effective only when no more than a single speaker at a time join to the conversation, requires a relatively long training period, and is sensitive to motion during this period.

The TF-LCMV beamformer may be used as well as its extended version for binaural speech enhancement system, together with a binaural cues generator. The acoustic cues are used to segregate speech components from noise components in the input signals. The technique is based on the auditory scene analysis theory[1], which suggest the use of distinctive perceptual cues to cluster signals from distinct speech sources in a "cocktail party" environment. Examples of primitive grouping cues that may be used for speech segregation include common onsets/offsets across frequency bands, pitch (fundamental frequency), same location in space, temporal and spectral modulation, pitch and energy continuity and smoothness. However, the underlying assumption of this method is that all the components of the desired speech signals have almost the same direction. That is, almost free-field conditions, saving the effect of the head-shadow effect, which is suggested to being compensated for by using head related transfer functions. This is unlikely to happen in a reverberant environment.

It should be noted that even when multiple speakers are active simultaneously, the spectral contents of the speakers do not overlap at most of the time-frequency points. This is called W-Disjoint Orthogonality, or briefly W-DO. This can be justified by the sparseness of speech signal in time-frequency domain. According to this sparseness, the probability of the simultaneous activity of two speakers in a specific time-frequency point is very low. In other words, in the case of multiple simultaneous speakers, each time-frequency point most likely corresponds to spectral content of one of speakers.

W-DO may be used to facilitate BSS by defining a specific class of signals which are W-DO to some extent. This may use only the first order statistics is needed, which is computationally economic. Furthermore, an arbitrary number of signal sources can be de-mixed using only two microphones, provided that the sources are W-DO and do not occupy the same spatial positions. However, this method assumes an identical underlying mixing matrix across all frequencies. This assumption is essential for using histograms of the estimated mixing coefficients across different frequencies. However, this assumption often does not hold true in a reverberant environment, but only in free-field. The extension of this method to the case of multipath is restricted to either negligible energy from the multipath, or to sufficiently smooth convolutive mixing filters so that the histogram is smeared, yet maintaining a single peak. This assumption too does not hold true in reverberant environments in which the difference between different paths is often too large to create a smooth histogram.

It has been found that the suggested solution performs in reverberant environments and does not have to rely on unnecessary assumptions and constraints. The solution may operate even without a-priory information, even without a large training process, even without constraining estimations of the attenuation and the delay of a given source at each frequency to a single point in the attenuation-delay space, even without constraining estimated values of the attenuation-delay values of a single source to create a single cluster, and even without limiting the number of mixed sounds to two.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component. For example—any reference to a method as including a certain step should also cover the scenario in which the method does not include the certain component. Yet for another example—any reference to a system that is configured to perform a certain operation should also cover the scenario in which the system is not configured to perform the certain operation.

The terms "including", "comprising", "having", "consisting" and "consisting essentially of " are used in an interchangeable manner. For example—any method may include at least the steps included in the figures and/or in the specification, only the steps included in the figures and/or the specification. The same applies to the system.

The system may include an array of microphones, a memory unit and one or more hardware processors such as digital signals processors, FPGAs, ASICs, a general-purpose processor programmed to execute any of the mentioned above method and the like. The system may not include the array of microphones but may be fed from sound signals generated by the array of microphones.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

Any system referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method of speech enhancement, the method comprises:

receiving or generating sound samples that represent sound signals received by an array of microphones during a given time period;

frequency transforming the sound samples to provide frequency-transformed samples;

clustering the frequency-transformed samples into a plurality of speaker-related clusters corresponding to a plurality of speakers, respectively, wherein the clustering is based on spatial cues related to the sound signals received by the array of microphones, and based on acoustic cues related to the plurality of speakers, wherein a speaker-related cluster corresponding to a speaker of the plurality of speakers comprises frequency-transformed samples, which are associated with the speaker based on the spatial cues and the acoustic cues, and wherein clustering the frequency-transformed samples comprises using the acoustic cues to assign to a same speaker frequency-transformed samples corresponding to sound signals received from both direct and indirect paths;

determining a plurality of speaker-related relative transfer functions corresponding to the plurality of speakers, respectively, wherein determining the plurality of speaker-related relative transfer functions comprises determining a speaker-related relative transfer function corresponding to the speaker of the plurality of speakers based on the frequency-transformed samples in the speaker-related cluster corresponding to the speaker;

applying a multiple input multiple output (MIMO) beamforming operation on the plurality of speaker-related relative transfer functions to provide beamformed signals; and inverse-frequency transforming the beamformed signals to provide speech signals corresponding to the plurality of speakers.

2. The method according to claim 1, wherein determining the speaker-related relative transfer function corresponding to the speaker comprises determining the speaker-related relative transfer function to represent a ratio, in a frequency domain, between two acoustic transfer functions of the speaker with respect to two respective microphones in the array of microphones.

3. The method according to claim 1 comprising generating the acoustic cues corresponding to the plurality of speakers by:

searching for a keyword in the sound samples; and extracting the acoustic cues from the keyword.

4. The method according to claim 3, further comprising extracting spatial cues related to the keyword.

5. The method according to claim 4, comprising using the spatial cues related to the keyword as a clustering seed for clustering the frequency-transformed samples to the plurality of speaker-related clusters.

6. The method according to claim 1, wherein the acoustic cues comprise one or more cues selected from the group consisting of pitch frequency, pitch intensity, one or more pitch frequency harmonics, and intensity of the one or more pitch frequency harmonics.

7. The method according to claim 1 comprising associating a reliability attribute to a pitch and determining that a speaker that is associated with the pitch is silent when a reliability of the pitch falls below a predefined threshold.

8. The method according to claim 1, wherein the clustering comprises processing the frequency-transformed samples to provide the acoustic cues and the spatial cues; tracking over time states of speakers using the acoustic cues; segmenting the spatial cues of frequency components of the frequency-transformed samples to groups; and assigning to a group of frequency-transformed samples an acoustic cue related to an active speaker.

9. The method according to claim 8, wherein the assigning comprises calculating, for the group of frequency-transformed samples, a cross-correlation between elements of equal-frequency lines of a time frequency map with elements that belong to other lines of the time frequency map and are related to the group of frequency-transformed samples.

10. The method according to claim 8, wherein the tracking comprises applying at least one of an extended Kalman filter, multiple hypothesis tracking, or a particle filter.

11. The method according to claim 8, wherein the segmenting comprises assigning a frequency component related to a time frame to a single speaker.

12. The method according to claim 8 comprising monitoring at least one monitored acoustic feature comprising at least one of speech speed, speech intensity or emotional utterances.

13. The method according to claim 12 comprising feeding the at least one monitored acoustic feature to at least one of an extended Kalman filter, multiple hypothesis tracking, or a particle filter.

14. The method according to claim 1, wherein clustering the frequency-transformed samples into the plurality of speaker-related clusters comprises:

processing the frequency-transformed samples to detect the acoustic cues according to a time-frequency map of the frequency-transformed samples;

processing the frequency-transformed samples to extract the spatial cues in a three-dimensional time-frequency-cue map; and assigning the frequency-transformed samples to the plurality of speaker-related clusters based on the acoustic cues and the spatial cues in the three-dimensional time-frequency-cue map.

15. The method according to claim 1 comprising processing the frequency-transformed samples arranged in a plurality of vectors corresponding to a respective plurality of microphones of the array of microphones, processing the frequency-transformed samples comprises calculating an intermediate vector by weight averaging the plurality of vectors, and searching for acoustic cue candidates by ignoring elements of the intermediate vector that have a value that is lower than a predefined threshold.

16. A non-transitory computer readable medium that stores instructions that once executed by a computerized system cause the computerized system to:

receive or generate sound samples that represent sound signals received by an array of microphones during a given time period;

frequency transform the sound samples to provide frequency-transformed samples;

cluster the frequency-transformed samples into a plurality of speaker-related clusters corresponding to a plurality of speakers, respectively, by clustering the frequency-transformed samples based on spatial cues related to the sound signals received by the array of microphones, and based on acoustic cues related to the plurality of speakers, wherein a speaker-related cluster corresponding to a speaker of the plurality of speakers comprises frequency-transformed samples, which are associated with the speaker based on the spatial cues and the acoustic cues, and wherein clustering the frequency-transformed samples comprises using the acoustic cues to assign to a same speaker frequency-transformed samples corresponding to sound signals received from both direct and indirect paths;

determine a plurality of speaker-related relative transfer functions corresponding to the plurality of speakers, respectively, by determining a speaker-related relative transfer function corresponding to the speaker of the plurality of speakers based on the frequency-transformed samples in the speaker-related cluster corresponding to the speaker;

apply a multiple input multiple output (MIMO) beamforming operation on the plurality of speaker-related relative transfer functions to provide beamformed signals; and inverse-frequency transform the beamformed signals to provide speech signals corresponding to the plurality of speakers.

17. The non-transitory computer readable medium according to claim 16, wherein the instructions, when executed, cause the computerized system to determine the speaker-related relative transfer function to represent a ratio, in a frequency domain, between two acoustic transfer functions of the speaker with respect to two respective microphones in the array of microphones.

18. A system comprising:

an array of microphones;

a memory; and a processor configured to:

receive or generate sound samples that represent sound signals received by the array of microphones during a given time period;

frequency transform the sound samples to provide frequency-transformed samples;

cluster the frequency-transformed samples into a plurality of speaker-related clusters corresponding to a plurality of speakers, respectively, by clustering the frequency-transformed samples based on spatial cues related to the sound signals received by the array of microphones, and based on acoustic cues related to the plurality of speakers, wherein a speaker-related cluster corresponding to a speaker of the plurality of speakers comprises frequency-transformed samples, which are associated with the speaker based on the spatial cues and the acoustic cues, and wherein clustering the frequency-transformed samples comprises using the acoustic cues to assign to a same speaker frequency-transformed samples corresponding to sound signals received from both direct and indirect paths;

determine a plurality of speaker-related relative transfer functions corresponding to the plurality of speakers, respectively, by determining a speaker-related relative transfer function corresponding to the speaker of the plurality of speakers based on the frequency-transformed samples in the speaker-related cluster corresponding to the speaker;

apply a multiple input multiple output (MIMO) beamforming operation on the plurality of speaker-related relative transfer functions to provide beamformed signals; and inverse-frequency transform the beamformed signals to provide speech signals corresponding to the plurality of speakers.

19. The system according to claim 18, wherein the processor is configured to determine the speaker-related relative transfer function to represent a ratio, in a frequency domain, between two acoustic transfer functions of the speaker with respect to two respective microphones in the array of microphones.

* * * * *